(12) United States Patent
Ozawa

(10) Patent No.: US 11,873,410 B2
(45) Date of Patent: Jan. 16, 2024

(54) INK SET AND RECORDING HEAD INSPECTION METHOD

(71) Applicant: KYOCERA Document Solutions Inc., Osaka (JP)

(72) Inventor: Noriaki Ozawa, Osaka (JP)

(73) Assignee: KYOCERA Document Solutions Inc., Osaka (JP)

(*) Notice: Subject to any disclaimer, the term of this patent is extended or adjusted under 35 U.S.C. 154(b) by 137 days.

(21) Appl. No.: 17/727,971

(22) Filed: Apr. 25, 2022

(65) Prior Publication Data

US 2022/0348778 A1  Nov. 3, 2022

(30) Foreign Application Priority Data

Apr. 28, 2021  (JP) ................. 2021-076325

(51) Int. Cl.
| | |
|---|---|
| *C09D 11/322* | (2014.01) |
| *C09D 11/38* | (2014.01) |
| *C09D 11/40* | (2014.01) |
| *B41J 2/21* | (2006.01) |
| *B41M 5/00* | (2006.01) |
| *B41J 2/165* | (2006.01) |
| *B41J 2/01* | (2006.01) |

(52) U.S. Cl.
CPC ........... *C09D 11/322* (2013.01); *B41J 2/2107* (2013.01); *B41M 5/0023* (2013.01); *C09D 11/38* (2013.01); *C09D 11/40* (2013.01); *B41J 2/01* (2013.01); *B41J 2/16579* (2013.01)

(58) Field of Classification Search
CPC ....... C09D 11/322; C09D 11/38; C09D 11/40; B41J 2/2107; B41J 2/16579; B41J 2/01; B41M 5/0023

See application file for complete search history.

(56) References Cited

U.S. PATENT DOCUMENTS

| | | | |
|---|---|---|---|
| 2007/0137519 A1* | 6/2007 | Sugimoto | C09D 11/30 106/31.13 |
| 2009/0145519 A1* | 6/2009 | Toyoda | H05K 3/125 141/392 |
| 2014/0292900 A1* | 10/2014 | Hoshi | C09D 11/38 106/31.86 |

FOREIGN PATENT DOCUMENTS

JP  2010-227729 A  10/2010

* cited by examiner

*Primary Examiner* — Yaovi M Ameh
(74) *Attorney, Agent, or Firm* — Studebaker & Brackett PC

(57) ABSTRACT

An ink set includes an inkjet ink and a recording head filling liquid. The inkjet ink contains a pigment, water, and 1,2-alkanediol with a carbon number of at least 7 or 8. The recording head filling liquid contains a specific surfactant, water, and a specific alcohol compound with a carbon number of at least 10 and no greater than 12. The specific surfactant has an HLB value of no greater than 5.0. An amount of content of the specific alcohol compound in the recording head filling liquid is at least 0.1 ppm and no greater than 1.0 ppm.

7 Claims, No Drawings

INK SET AND RECORDING HEAD INSPECTION METHOD

INCORPORATION BY REFERENCE

The present application claims priority under 35 U.S.C. § 119 to Japanese Patent Application No. 2021-076325, filed on Apr. 28, 2021. The contents of this application are incorporated herein by reference in their entirety.

BACKGROUND

The present disclosure relates to an ink set and a recording head inspection method.

An inkjet recording apparatus includes a recording head that ejects an inkjet ink. The recording head is a precision machine required to have extremely high precision. As such, a manufacturer of the recording head typically ships the recording head only after adequate inspection of ejection performance and the like of the recording head after manufacture thereof.

In inspection of ejection performance of the recording head, the recording head is actually filled with an inkjet ink and undergoes an ejection test. The inkjet ink inevitably remains in an ink flow channel of the recording head after the inspection. Due to the ink flow channel of the recording head being very fine, it is difficult to thoroughly remove the inkjet ink remaining in the ink flow channel even by washing of the recording head. When the recording head with the inkjet ink remaining in the ink flow channel thereof is shipped, a solvent of the inkjet ink may evaporate during transportation or storage to cause agglomeration of a solid content (particularly, a pigment component) of the inkjet ink, thereby generating agglomerate. The agglomerate may serve as a cause of ejection failure of the recording head after shipping.

In view of the foregoing, the manufacturer of the recording head may ship the recording head with a solution (also referred to below as recording head filling liquid) containing no pigment components filled therein. The recording head filling liquid gets into the ink flow channel of the recording head to dilute the inkjet ink remaining in the ink flow channel. This makes it difficult for the solid content of the inkjet ink remaining in the ink flow channel to agglomerate. A recording head filling liquid such as above is required to be easily run into the ink flow channel of the recording head and inhibit agglomeration of the solid content of the inkjet ink in the recording head. As a recording head filling liquid to be filled in the recording head, a recording head filling liquid containing a silicone oil is proposed, for example.

SUMMARY

An ink set according to an aspect of the present disclosure includes an inkjet ink and a recording head filling liquid. The inkjet ink contains a pigment, water, and 1,2-alkanediol with a carbon number of 7 or 8. The recording head filling liquid contains a specific surfactant, water, and a specific alcohol compound with a carbon number of at least 10 and no greater than 12. The specific surfactant has an HLB value of no greater than 5.0. An amount of content of the specific alcohol compound in the recording head filling liquid is at least 0.1 ppm and no greater than 1.0 ppm.

A recording head inspection method according to an aspect of the present disclosure is a recording head inspection method using the above-described ink set, and includes performing inspection to inspect ejection performance of a recording head, and filling the recording head filling liquid into the recording head after the performing inspection. In the performing inspection, the ejection performance of the recording head is inspected by ejecting the inkjet ink from the recording head.

DETAILED DESCRIPTION

The following describes embodiments of the present disclosure. In the following, measured values for volume median diameter ($D_{50}$) are values as measured using a dynamic light scattering type particle size distribution analyzer ("ZETASIZER NANO ZS", product of Malvern Instruments Ltd.) unless otherwise stated.

In the following, measured values for acid value are values as measured in accordance with "the Japanese Industrial Standards (JIS) K0070-1992" unless otherwise stated. Also, measured values for mass average molecular weight (Mw) are values as measured by gel permeation chromatography unless otherwise stated.

Note that in the present specification, the term "(meth) acryl" is used as a generic term for both acryl and methacryl. In addition, "1 ppm" indicates 0.0001% by mass.

First Embodiment: Ink Set

The following describes an ink set according to a first embodiment of the present disclosure. The ink set of the present disclosure includes an inkjet ink (also referred to below simply as ink) and a recording head filling liquid (also referred to below simply as filling liquid). The ink contains a pigment, water, and 1,2-alkanediol with a carbon number of 7 or 8. The filling liquid contains a specific surfactant, water, and a specific alcohol compound with a carbon number of at least 10 and no greater than 12. The specific surfactant has an HLB value of no greater than 5.0. An amount of content of the specific alcohol compound in the filling liquid is at least 0.1 ppm and no greater than 1.0 ppm.

The filling liquid of the ink set of the present disclosure is used in a manner to be filled into a recording head in which the ink remains. In a situation for example in which the recording head is not used for a while for some reason after ink ejection by the recording head, the filling liquid is used in a manner to be filled into the recording head. Specifically, the filling liquid is filled in the recording head in shipping of the recording head, long-term storage of the recording head, or transportation of the recording head. The ink set of the present disclosure is suitable as an ink set used in a recording head inspection method according to a second embodiment.

As a result of the ink set of the present disclosure having the above features, the filling liquid can easily run into an ink flow channel of the recording head and agglomeration of pigment components (e.g., the pigment and a pigment covering resin described later) of the ink in the recording head can be effectively inhibited. The reasons for this are surmised as follows. The filling liquid contains a specific surfactant with an HLB value of no greater than 5.0 (surfactant with relatively high hydrophobicity). The specific surfactant effectively reduces surface activity of the filling liquid. Furthermore, the ink contains 1,2-alkanediol with a carbon number of 7 or 8. 1,2-Alkanediol with such a long chain has in its molecular a highly hydrophilic moiety and a highly hydrophobic moiety, and the molecule thereof has relatively high hydrophobicity as a whole. As such, the 1,2-alkanediol reduces surface activity of the ink. Therefore, the ink of the ink set of the present disclosure readily diffuses in the filling liquid when the filling liquid is filled in the recording head in which the ink remains. From the above, the filling liquid of the ink set of the present disclosure can easily run into the ink flow channel of the recording head.

By contrast, the specific surfactant alone tends to make it difficult to form micelles and disperse the pigment in the ink when the ink and the filling liquid are mixed. By contrast, the filling liquid of the ink set of the present disclosure contains a specific amount of the specific alcohol compound with a carbon number of at least 10 and no greater than 12. A specific alcohol compound such as above promotes micelle formation of the specific surfactant. As such, in the ink set of the present disclosure, the specific surfactant forms micelles when the ink and the filling liquid are mixed to disperse the pigment in the ink. From the above, agglomeration of the pigment components of the ink in the recording head can be inhibited in the ink set of the present disclosure.

The ink set of the present disclosure will be described further in detail below. One type of each component described below may be used independently, or two or more types of the component may be used in combination.

[Ink]

The ink contains a pigment, water, and 1,2-alkanediol with a carbon number of 7 or 8. Preferably, the ink further contains a pigment covering resin. For example, the pigment in the ink forms pigment particles together with the pigment covering resin. The pigment particles are present in a state of being dispersed in a solvent. In terms of improving color density, hue, or stability of the ink, the pigment particles have a D50 of preferably at least 30 nm and no greater than 200 nm, and more preferably at least 70 nm and no greater than 130 nm.

(Pigment)

Examples of the pigment contained in the ink include yellow pigments, orange pigments, red pigments, blue pigments, violet pigments, and black pigments. Examples of the yellow pigments include C.I. Pigment Yellow (74, 93, 95, 109, 110, 120, 128, 138, 139, 151, 154, 155, 173, 180, 185, or 193). Examples of the orange pigments include C.I. Pigment Orange (34, 36, 43, 61, 63, or 71). Examples of the red pigments include C.I. Pigment Red (122 or 202). Examples of the blue pigments include C.I. Pigment Blue (15, more specifically 15:3). Examples of the violet pigments include C.I. Pigment Violet (19, 23, or 33). Examples of the black pigments include C.I. Pigment Black (7).

The percentage content of the pigment in the ink is preferably at least 1.0% by mass and no greater than 12.0% by mass, and more preferably at least 4.0% by mass and no greater than 8.0% by mass. As a result of the percentage content of the pigment being set to at least 1.0% by mass, an image with a desired image density can be formed with the ink. As a result of the percentage content of the pigment being set to no greater than 12.0% by mass, fluidity of the ink can be increased.

(Pigment Covering Resin)

The pigment covering resin is a resin soluble in the ink. A portion of the pigment covering resin is present for example on the surfaces of the pigment particles to increase dispersibility of the pigment particles. Another portion of the pigment covering resin is present for example in a state of being dissolved in the ink.

A preferable pigment covering resin is a styrene-acrylic resin. The styrene-acrylic resin is a copolymer of styrene and at least one monomer of (meth)acrylic acid alkyl ester and (meth)acrylic acid. The styrene-acrylic resin preferably includes a repeating unit derived from (meth)acrylic acid ((meth)acrylic acid unit), a repeating unit derived from (meth)acrylic acid alkyl ester ((meth)acrylic acid alkyl ester unit), and a styrene unit.

Examples of the (meth)acrylic acid alkyl ester include methyl (meth)acrylate, ethyl (meth)acrylate, propyl (meth) acrylate, butyl (meth)acrylate, 2-ethylhexyl (meth)acrylate, and octyl (meth)acrylate. A preferable (meth)acrylic acid alkyl ester is methyl methacrylate or butyl acrylate.

The ratio of the (meth) acrylic acid unit to all repeating units included in the pigment covering resin is preferably at least 20% by mass and no greater than 60% by mass. The ratio of the (meth) acrylic acid alkyl ester unit to all the repeating units included in the pigment covering resin is preferably at least 30% by mass and no greater than 65% by mass. The ratio of the styrene unit to all the repeating units included in the pigment covering resin is preferably at least 5% by mass and no greater than 25% by mass. Further preferably, the pigment covering resin is a resin including a repeating unit derived from methacrylic acid, a repeating unit derived from methyl methacrylate, a repeating unit derived from butyl acrylate, and a styrene unit.

The percentage content of the pigment covering resin in the ink is preferably at least 0.5% by mass and no greater than 8.0% by mass, and more preferably at least 1.5% by mass and no greater than 4.0% by mass. As a result of the percentage content of the pigment covering resin being set to at least 0.5% by mass, dispersibility of the pigment components can be further increased. As a result of the percentage content of the pigment covering resin being set to no greater than 8.0% by mass, occurrence of nozzle clogging with the ink can be inhibited.

The pigment covering resin has an acid value of at least 50 mg KOH/g and no greater than 150 mg KOH/g, for example. As a result of the acid value of the pigment covering resin being set to at least 50 mg KOH/g and no greater than 150 mg KOH/g, dispersibility of the pigment components can be further increased and preservation stability of the ink can be increased.

The acid value of the pigment covering resin can be adjusted by changing the amount of a monomer used in synthesis of the pigment covering resin. For example, use of a monomer (specific examples include acrylic acid and methacrylic acid) having an acidic functional group (e.g., a carboxy group) in synthesis of the pigment covering resin can increase the acid value of the pigment covering resin.

The pigment covering resin has a Mw of at least 10,000 and no greater than 50,000, for example. As a result of the Mw of the pigment covering resin being set to at least 10,000 and no greater than 50,000, an increase in viscosity of the ink can be suppressed and an image with a desired image density can be formed with the ink.

The Mw of the pigment covering resin can be adjusted by changing a condition (specific examples include the amount of a polymerization initiator used, a polymerization temperature, and a polymerization time) for polymerization of the pigment covering resin.

The amount of the polymerization initiator used in polymerization of the pigment covering resin is preferably at least 0.001 mol and no greater than 5 mol relative to 1 mol of a monomer mixture, and more preferably at least 0.01 mol and no greater than 2 mol. In polymerization of the pigment covering resin, for example, the polymerization temperature may be at least 50° C. and no greater than 70° C. and the polymerization time may be at least 10 hours and no greater than 24 hours. Note that polymerized pigment covering resin may be used directly as a raw material of the ink or may be used as a raw material of the ink after neutralization with an equivalent amount of a basic compound. The basic compound is preferably a hydroxide (e.g., NaOH) of an alkali metal ion.

(1,2-Alkanediol)

The 1,2-alkanediol has a carbon number of 7 or 8. Examples of the 1,2-alkanediol include 1,2-heptanediol and 1,2-octanediol.

The percentage content of the 1,2-alkanediol in the ink is preferably at least 0.2% by mass and no greater than 2.0% by mass, and more preferably at least 0.7% by mass and no greater than 1.5% by mass. As a result of the percentage content of the 1,2-alkanediol being set to at least 0.2% by mass, the filling liquid can easily run into the ink flow channel of the recording head. As a result of the percentage content of the 1,2-alkanediol being set to no greater than 2.0% by mass, agglomeration of the pigment components of the ink in the recording head can be further effectively inhibited.

(Water)

The water is a main solvent of the ink. The percentage content of the water in the ink is at least 40.0% by mass and no greater than 75.0% by mass, for example.

(Additional Water-soluble Organic Solvent)

Preferably, the ink further contains an additional water-soluble organic solvent other than the 1,2-alkanediol. Examples of the additional water-soluble organic solvent in the ink include glycol compounds, glycol ether compounds, lactam compounds, nitrogen-containing compounds, acetate compounds, thiodiglycol, glycerin, and dimethyl sulfoxide.

Examples of the glycol compounds include ethylene glycol, 1,3-propanediol, propylene glycol, 1,5-pentanediol, 1,2-octanediol, 1,8-octanediol, 3-methyl-1,5-pentanediol, diethylene glycol, triethylene glycol, and tetraethylene glycol.

Examples of the glycol ether compounds include diethylene glycol diethyl ether, diethylene glycol monobutyl ether, ethylene glycol monomethyl ether, ethylene glycol monobutyl ether, diethylene glycol monomethyl ether, diethylene glycol monoethyl ether, diethylene glycol diethyl ether, triethylene glycol monomethyl ether, triethylene glycol monoethyl ether, triethylene glycol monobutyl ether, and propylene glycol monomethyl ether.

Examples of the lactam compounds include 2-pyrrolidone and N-methyl-2-pyrrolidone.

Examples of the nitrogen-containing compounds include 1,3-dimethylimidazolidinone, formamide, and dimethyl formamide Examples of the acetate compounds include diethylene glycol monoethyl ether acetate.

A preferable additional water-soluble organic solvent in the ink is triethylene glycol monobutyl ether, 2-pyrrolidone, or glycerin.

The percentage content of the additional water-soluble organic solvent in the ink is preferably at least 10.0% by mass and no greater than 45.0% by mass, and more preferably at least 25.0% by mass and no greater than 35.0% by mass. As a result of the percentage content of the additional water-soluble organic solvent being set to at least 10.0% by mass and no greater than 45.0% by mass, ejection stability of the ink can be increased.

(Surfactant)

Preferably, the ink further contains a surfactant. The surfactant increases compatibility and dispersion stability of each component contained in the ink. The surfactant also increases permeability (wettability) of the ink to a recording medium. A preferable surfactant in the ink is a nonionic surfactant.

Examples of the nonionic surfactant in the ink include acetylene glycol-based surfactants (surfactants containing an acetylene glycol compound), silicone-based surfactants (surfactants containing a silicone compound), and fluorine-based surfactants (surfactants containing fluororesin or a fluorine-containing compound). Examples of the acetylene glycol-based surfactants include ethylene oxide adducts of acetylene glycol and propylene oxide adducts of acetylene glycol.

In a case in which the ink contains a surfactant, the percentage content of the surfactant in the ink is preferably at least 0.1% by mass and no greater than 2.0% by mass, and more preferably at least 0.2% by mass and no greater than 0.6% by mass.

(Additive)

The ink may further contain a known additive (e.g., a solution stabilizer, an anti-drying agent, an antioxidant, a viscosity modifier, a pH adjuster, and/or an antifungal agent) as necessary.

(Ink Production Method)

The ink can be produced for example by mixing water, a pigment dispersant, 1,2-alkanediol with a carbon number of 7 or 8, and a component (e.g., an additional water-soluble organic solvent and a surfactant) added as necessary. The pigment dispersion contains a pigment, a pigment covering resin, and water. The pigment covering resin is prepared for example by equivalent neutralization of an alkali-soluble resin with a basic compound (e.g., NaOH). The pigment dispersion can be prepared in a manner that a pigment is added to an aqueous solution containing a pigment covering resin and dispersed therein. An example of an apparatus used for dispersion is a bead mill. In ink production, foreign matter and coarse particles may be removed using a filter (e.g., a filter with a pore size of no greater than 5μm) after mixing.

[Filling Liquid]

The filling liquid contains a specific surfactant, water, and a specific alcohol compound with a carbon number of at least 10 and no greater than 12.

(Specific Alcohol Compound)

Examples of the specific alcohol compound include n-decyl alcohol, 2-propyl-1-heptanol, n-undecyl alcohol, n-dodecyl alcohol, and 2-butyl-1-octanol. The specific alcohol compound is preferably n-decyl alcohol or n-dodecyl alcohol.

The amount of content of the specific alcohol compound in the filling liquid is at least 0.1 ppm and no greater than 1.0 ppm, and preferably at least 0.3 ppm and no greater than 0.7 ppm. As a result of the amount of content of the specific alcohol compound being set to at least 0.1 ppm and no greater than 1.0ppm, the ink set of the present disclosure can effectively inhibit agglomeration of the pigment components of the ink in the recording head.

(Specific Surfactant)

The specific surfactant has an HLB value of no greater than 5.0. The HLB of the specific surfactant is preferably at least 2.0 and no greater than 5.0, and more preferably at least 3.5 and no greater than 4.5. As a result of the HLB value of the specific surfactant being set to no greater than 5.0, the filling liquid of the ink set of the present disclosure can easily run into the ink flow path of the recording head.

Note that "HLB value" refers to a value indicating the degree of affinity of a surfactant to water or oil and can be obtained based on the Griffin's method using the following equation. In detail, a surfactant with an HLB value of closer to 0 has higher lipophilicity. By contrast, a surfactant with an HLB value of closer to 20 has higher hydrophilicity.

HLB value=20×(sum of formula weights of hydrophilic moieties)/molecular weight

The specific surfactant is preferably a nonionic surfactant, and more preferably an acetylene glycol-based surfactant or a sorbitan fatty acid ester.

Examples of a commercially available acetylene glycol-based surfactant include "OLFINE (registered Japanese trademark) Series" (e.g., "D-10A", "D-10PG", and "Exp4300") produced by Nissin Chemical Industry Co., Ltd. and "SURFYNOL (registered Japanese trademark) Series" (e.g., "104", "420", and "DF110D") produced by Nissin Chemical Industry Co., Ltd.

Examples of the sorbitan fatty acid ester include sorbitan stearyl esters (e.g., sorbitan monostearate, sorbitan distearate, and sorbitan tristearate) and sorbitan oleyl esters (e.g., sorbitan monooleate and sorbitan trioleate).

Examples of a commercially available sorbitan fatty acid ester include "ADEKA ESTOL (registered Japanese trademark) Series" (e.g., "S-60" and "S-80") produced by ADEKA Corporation, and "RHEODOL (registered Japanese trademark) Series" (e.g., "SP-S10V", "SP-S20", "SP-S30V", "SP-O10V", "SP-030V", "AS-10V", "AO-10V", and "AO-15V") produced by Kao Corporation.

The percentage content of the specific surfactant in the filling liquid is preferably at least 0.03% by mass and no greater than 0.30% by mass, and more preferably at least 0.07% by mass and no greater than 0.20% by mass. As a result of the percentage content of the specific surfactant being set to at least 0.03% by mass and no greater than 0.30% by mass, the filling liquid can easily run into the ink flow path of the recording head and agglomeration of the pigment components of the ink in the recording head can be further effectively inhibited.

(Polyhydric Alcohol Compound)

Preferably, the filling liquid further contains a polyhydric alcohol compound. Examples of the polyhydric alcohol compound include diol compounds (glycol compounds), triol compounds, and sugar alcohols.

Examples of the polyhydric alcohol compound include polyethylene glycol (e.g., polyethylene glycol with a molecular weight of at least 150 and no greater than 400), ethylene glycol, 1,3-propanediol, propylene glycol, 1,5-pentanediol, 1,2-octanediol, 1,8-octanediol, 3-methyl-1,5-pentanediol, diethylene glycol, triethylene glycol, tetraethylene glycol, 1,2,6-hexanetriol, thiodiglycol, hexylene glycol, glycerin, trimethylolethane, trimethylolpropane, and sorbitol. A preferable polyhydric alcohol compound is polyethylene glycol, tetraethylene glycol, or glycerin.

The percentage content of the polyhydric alcohol compound in the filling liquid is preferably at least 20.0% by mass and no greater than 60.0% by mass, and more preferably at least 30.0% by mass and no greater than 50.0% by mass. As a result of the percentage content of the polyhydric alcohol compound being set to at least 20.0% by mass and no greater than 60.0% by mass, agglomeration of the pigment components of the ink in the recording head can be further effectively inhibited.

(Water)

The water is a main solvent of the filling liquid. The percentage content of the water in the filling liquid is at least 40.0% by mass and no greater than 70.0% by mass, for example.

(Additive)

The filling liquid may further contain a known additive (e.g., a solution stabilizer, an anti-drying agent, an antioxidant, a viscosity modifier, a pH adjuster, and/or an antifungal agent) as necessary.

Preferably, the filling liquid further contains a pH adjuster. Examples of the pH adjuster include basic compounds. A preferable basic compound is a hydroxide (e.g., NaOH) of alkali metal ion. The filling liquid preferably has a pH of at least 7 and no greater than 10.

(Filling Liquid Production Method)

The filling liquid can be produced for example by mixing a specific alcohol compound, a specific surfactant, water, and an optional component (e.g., a polyhydric alcohol compound and/or an additive) used as necessary.

Second Embodiment: Recording Head Inspection Method

The following describes a recording head inspection method according to a second embodiment of the present disclosure. The recording head inspection method of the present disclosure is a recording head inspection method using the ink set according to the first embodiment, and includes performing inspection to inspect ejection performance of a recording head and filling the filling liquid into the recording head after the performing inspection. In the performing inspection, ejection performance of the recording head is inspected by ejecting the ink from the recording head.

Because the recording head inspection method of the present disclosure uses the ink set of the first embodiment, ejection failure can be prevented from occurring in the recording head after the inspection. The recording head inspection method of the present disclosure is performed for example by a manufacturer of the recording head before shipping of the recording head. Although no particular limitations are placed on the recording head to be inspected by the recording head inspection method of the present disclosure, the recording head may be a piezoelectric inkjet recording head or a thermal inkjet recording head, for example.

[Performing Inspection]

In the performing inspection, ejection performance of the recording head is inspected. Specifically, ejection performance of the recording head is inspected by ejecting the ink from the recording head in the performing inspection. The ink remains in an ink flow channel of the recording head after the performing inspection.

In the performing inspection, the recording head after inspection may be washed. Although no particular limitations are placed on the method for washing the recording head, examples of the method include a method in which a wash fluid is filled into the recording head and then ejected from the recording head. Examples of the wash fluid include water or a wash fluid containing a water-soluble organic solvent. It is difficult to thoroughly remove the ink in the ink flow channel even by washing the recording head in the performing inspection.

[Filling]

The filling liquid is filled into the recording head in the filling. After the filling, the recording head is stored for shipment or transported for shipment, for example. After the recording head is delivered to a user, the filling liquid can be discharged from the recording head by ejecting the filling liquid from the recording head.

EXAMPLES

The following describes Examples of the present disclosure. However, the present disclosure is not limited to Examples below.

<Study A: Surfactant in Filling Liquid>

In Examples, the surfactant used for the filling liquid was studied first.

[Preparation of Pigment Covering Resin (R)]

An alkali-soluble resin was prepared that included a repeating unit (MAA unit) derived from methacrylic acid, a repeating unit (MMA unit) derived from methyl methacrylate, a repeating unit (BA unit) derived from butyl acrylate, and a repeating unit (ST unit) derived from styrene. The alkali-soluble resin had a mass average molecular weight (Mw) of 20,000 and an acid value of 100 mg KOH/g. The mass ratio (MAA unit: MMA unit: BA unit: ST unit) of the repeating units in the alkali-soluble resin was 40:15:30:15. The alkali-soluble resin was mixed with an aqueous sodium hydroxide solution containing sodium hydroxide (neutralization). By the neutralization, the alkali-soluble resin was neutralized with an equivalent amount (strictly speaking, 105% amount) of NaOH. Through the above, a pigment covering resin solution was obtained that contained a pigment covering resin (R) and water. The Mw of the alkali-soluble resin was measured using a gel permeation chromatography system ("HLC-8020GPC", product of Tosoh Corporation) under the following conditions. A calibration curve was plotted using n-propylbenzene and F-40, F-20, F-4, F-1, A-5000, A-2500, and A-1000 each being TSKgel standard polystyrene produced by Tosoh Corporation.

(Mass Average Molecular Weight Measurement Conditions)

Column: "TSKgel SuperMultipore HZ-H" produced by Tosoh Corporation (semi-micron column with a dimension of 4.6 mm I.D.×15 cm).

Number of columns: 3

Eluent: tetrahydrofuran

Flow rate: 0.35 mL/min

Sample injection amount: 10 pL

Measurement temperature: 40° C.

Detector: IR detector

[Preparation of Pigment Dispersion (D)]

A pigment ("LIONOL (registered Japanese trademark) Blue FG-7330", product of TOYOCOLOR CO., LTD., component: copper phthalocyanine, color index: Pigment Blue 15:3), the above-described pigment covering resin solution containing the pigment covering resin (R), "OLFINE (registered Japanese trademark) E1010" (product of Nissin Chemical Industry Co., Ltd., ethylene oxide adduct of acetylene glycol) being an acetylene glycol-based surfactant, and ion exchange water were charged into a vessel of a media type wet disperser ("DYNO (registered Japanese trademark)-MILL", product of Willy A. Bachofen AG) so that the respective percentage contents were as shown below in Table 1.

Note that the percentage content of "Water" below in Table 1 indicates the total percentage content of ion exchange water charged into the vessel and water contained in the pigment covering resin solution (specifically, water contained in the aqueous sodium hydroxide solution used for neutralization of the alkali-soluble resin and water produced in the neutralization reaction of the alkali-soluble resin and sodium hydroxide).

TABLE 1

| Pigment dispersion | Percentage content [% by mass] |
| --- | --- |
| Water | 78.5 |
| Pigment covering resin (R) (NaOH for neutralization) | 6.0 |
| Pigment | 15.0 |
| Acetylene glycol-based surfactant | 0.5 |
| Total | 100.0 |

Next, the vessel contents were wet-dispersed. Zirconia beads (particle diameter 1.0 mm) were used as a medium. The amount of the medium charged was 70% by volume relative to the capacity of the vessel. Conditions for the wet dispersion included a temperature of 10° C. and a peripheral speed of 8 m/sec. Through the above, a pigment dispersion (D) was obtained.

The volume median diameter ($D_{50}$) of pigment particles contained in the resultant pigment dispersion (D) was measured. In detail, the resultant pigment dispersion (D) was diluted 300 times with ion exchange water and the resultant product was taken to be a measurement sample. The $D_{50}$ of the pigment particles in the measurement sample was measured using a dynamic light scattering type particle size distribution analyzer ("ZETASIZER NANO ZS", product of Malvern Instruments Ltd.). The $D_{50}$ of the pigment particles in the measurement sample was taken to be a $D_{50}$ of the pigment particles contained in the pigment dispersions (D). The $D_{50}$ of the pigment particles contained in the pigment dispersion (D) was 100 nm.

[Preparation of Ink (I-1)]

Ion exchange water was charged into a flask equipped with a stirrer ("THREE-ONE MOTOR (registered Japanese trademark) BL-600", product of Shinto Scientific Co., Ltd.). The above-described pigment dispersion (D), an acetylene glycol-based surfactant ("SURFYNOL (registered Japanese trademark) 420", product of Nissin Chemical Industry Co., Ltd.), triethylene glycol monobutyl ether, 2-pyrrolidone, glycerin, 1,2-octanediol, and ion exchange water were charged into the flask in the stated order while the flask contents were stirred (stirring speed: 400 rpm) using the stirrer. The percentage content of each raw material charged was as shown below in Table 2. In Table 2 below, "(R)" indicates being a registered Japanese trademark.

TABLE 2

| Ink | Amount charged [% by mass] |
| --- | --- |
| Pigment dispersion (D) | 40.0 |
| SURFYNOL (R) 420 | 0.3 |
| Triethylene glycol monobutyl ether | 4.0 |
| 2-Pyrrolidone | 5.0 |
| Glycerin | 20.0 |
| 1,2-Octanediol | 0.1 |
| Ion exchange water | Rest |
| Total | 100.0 |

The resultant mixed liquid was filtered using a filter with a pore size of 5 μm in order to remove foreign matter and coarse particles from the mixed liquid. Through the above, an ink (I-1) was obtained.

[Preparation of Filling Liquids (F-1) to (F-7)]

Filling liquids (F-1) to (F-7) were prepared according to the following methods. First, surfactants (S-1) to (S-7) used for preparing the filling liquids (F-1) to (F-7) are shown below in Table 3. In Table 3, "(R)" indicates being a registered Japanese trademark. "EO adduct" indicates ethylene oxide adduct.

TABLE 3

|  | S-1 | S-2 | S-3 | S-4 | S-5 | S-6 | S-7 |
|---|---|---|---|---|---|---|---|
| Name | OLFINE (R) Exp4300 | SURFYNOL (R) 104 | ADEKA ESTOL (R) S-60 | RHEODOL (R) SP-S20 | ADEKA ESTOL (R) S-80 | SURFYNOL (R) SEF | AKDEKANOL (R) NK-3 |
| Component | acetylene glycol | acetylene glycol | sorbitan stearyl ester | sorbitan distearate | Sorbitan oleyl ester | Acetylene glycol | EO adduct of glycerite |
| Manufacturer | Nissin Chemical Industry Co., Ltd. | Nissin Chemical Industry Co., Ltd. | ADEKA Corporation | Kao Corporation | ADEKA Corporation | Nissin Chemical Industry Co., Ltd. | ADEKA Corporation |
| HLB value | 4.0 | 4.0 | 4.7 | 4.4 | 4.3 | 6.0 | 6.2 |

[Preparation of Filling Liquid (F-1)]

A mixed liquid was obtained by mixing 30.0 parts by mass of tetraethylene glycol (TEG), 0.10 parts by mass of the surfactant (S-1) ("OLFINE (registered Japanese trademark) Exp4300", product of Nissin Chemical Industry Co., Ltd., acetylene glycol-based surfactant), 7.0 parts by mass of glycerin, sodium hydroxide, 0.00005 parts by mass (0.5 ppm) of n-decyl alcohol, and water. The amount of the sodium hydroxide added was an amount (trace amount) that brought the pH of the mixed liquid to 8.0 to 9.0. The amount of the water added was an amount that brought the total amount of the mixed liquid to 100 parts by mass. The mixed liquid was taken to be a filling liquid (F-1).

[Preparation of Filling Liquids (F-2) to (F-7)]

Filling liquids (F-2) to (F-7) were prepared according to the same method as that for preparing the filling liquid (F-1) in all aspects other than that the amounts of the components added were changed to those shown below in Table 4.

[Preparation of Ink Sets (IS-1) to (IS-7)]

The ink (I-1) was combined with any one of the filling liquids (F-1) to (F-7) as shown below in Table 4. Through the above, ink sets (IS-1) to (IS-7) were prepared.

[Evaluation]

With respect to each of the ink sets (IS-1) to (IS-7), agglomeration inhibition of the ink and runniness (property of the filling liquid of easily running into an ink flow channel of a recording head) of the filling liquid were evaluated. Evaluation results are shown in Table 4.

(Agglomeration Inhibition)

With respect to the ink set being an evaluation target, 1 part by mass of the ink (the ink (I-1) in Study A) and 50 parts by mass of the filling liquid (any of the filling liquids (F-1) to (F-7) in Study A) were mixed in a beaker. Next, the beaker containing the resultant mixed liquid was stored (storage) in a constant temperature bath at 40° C. for 1 month. The mixed liquid after the storage reduced in volume about 50% through evaporation. With respect to the mixed liquid after the storage, the presence or absence of agglomerate with a particle diameter of at least 3μm was analyzed using a particle shape image analyzer ("FPIA (registered Japanese trademark)-3000", product of Malvern Panalytical Ltd.). Agglomeration inhibition of the ink was evaluated as "A (acceptable)" if agglomerate with a particle diameter of at least 3μm was not generated after the storage, and evaluated as "B (rejected)" if agglomerate with a particle diameter of at least 3 μm was generated after the storage.

Note that when a filling liquid is filled into a recording head after inspection of the recording head, residual ink and the filling liquid were mixed in the recording head. The mixing ratio (amount of ink/amount of filling liquid) between the residual ink and the filling liquid varies depending on parts of the recording head, but is expected to be about 1/50 at maximum. Therefore, the mixing ratio between the ink and the filling liquid was assumed to be 1 part by mass (ink): 50 parts by mass (filling liquid). Furthermore, agglomerate with a particle diameter of at least 3 μm generated in the recording head may cause clogging of a filter disposed inside the recording head to lead to ejection failure of the ink. Therefore, whether or not agglomerate with a particle diameter of at least 3 μm was generated after the storage was used as a criteria for determination as to whether or not ink agglomeration was inhibited.

(Runniness)

A non-used recording head ("KJ4B-QA", product of KYOCERA Corporation, total number of nozzles: 2656) was washed with pure water, and dried sufficiently. The recording head was filled with 25 mL of the filling liquid (any of the filling liquids (F-1) to (F-7) in Study A) included in the ink set being the evaluation target. Thereafter, the filling liquid was discharged from the recording head by ejecting the filling liquid from the recording head. The above operation was performed 10 times in total (total filling 250 mL). Thereafter, the filling liquid was re-filled into the recording head. Thereafter, a nozzle check pattern was printed on a glass plate using the recording head filled with the filling liquid. In the manner described above, the nozzle check pattern was formed on the glass plate with the filling liquid. Next, the glass plate was scanned using a scanner to count the number (ejection nozzle count) of ejection nozzles from which the filling liquid has been ejected. A rate [%] (runniness) of the number of the ejection nozzles to the total number (2656) of the nozzles of the recording head was obtained using the following equation. Runniness of the filling liquid was evaluated according to the following criteria.

Runniness=100×number of ejection nozzles/total number of nozzles (Criteria for Runniness Determination)

A (acceptable): runniness of at least 90%
B (rejected): runniness of less than 90%

TABLE 4

|  |  |  | Ink set ||||||| 
|---|---|---|---|---|---|---|---|---|---|
|  |  |  | IS-1 | IS-2 | IS-3 | IS-4 | IS-5 | IS-6 | IS-7 |
| Ink | Type |  | I-1 | I-1 | I-1 | I-1 | I-1 | I-1 | I-1 |
| Filling liquid | Type |  | F-1 | F-2 | F-3 | F-4 | F-5 | F-6 | F-7 |
|  | TEG [% by mass] |  | 30.0 | 30.0 | 30.0 | 30.0 | 30.0 | 30.0 | 30.0 |
|  | Surfactant | Type | S-1 | S-2 | S-3 | S-4 | S-5 | S-6 | S-7 |
|  |  | % by mass | 0.10 | 0.10 | 0.10 | 0.12 | 0.15 | 0.10 | 0.10 |

TABLE 4-continued

|  |  | Ink set | | | | | | |
|---|---|---|---|---|---|---|---|---|
|  |  | IS-1 | IS-2 | IS-3 | IS-4 | IS-5 | IS-6 | IS-7 |
|  | Glycerin [% by mass] | 7.0 | 7.0 | 7.0 | 7.0 | 7.0 | 7.0 | 7.0 |
|  | Sodium hydroxide | Used to adjust pH to 8.0 to 9.0 (trace amount) | | | | | | |
|  | n-Decyl alcohol [ppm] | 0.5 | 0.5 | 0.5 | 0.5 | 0.5 | 0.5 | 0.5 |
|  | Water | Rest | Rest | Rest | Rest | Rest | Rest | Rest |
|  | Total [% by mass] | 100.0 | 100.0 | 100.0 | 100.0 | 100.0 | 100.0 | 100.0 |
| Evaluation | Agglomeration inhibition | A | A | A | A | A | A | A |
|  | Runniness | A | A | A | A | A | B | B |

As shown in Tables 1 to 4, each of the filling liquids (F-1) to (F-5) respectively included in the ink sets (IS-1) to (IS-5) contained a specific surfactant with an HLB value of no greater than 5.0. In each of the ink sets (IS-1) to (IS-5), the filling liquid easily run into the ink flow channel of the recording head and agglomeration of the pigment components of the ink in the recording head was effectively inhibited.

By contrast, each of the filling liquids (F-6) and (F-7) respectively included in the ink sets (IS-6) and (IS-7) contained a surfactant with an HLB value of greater than 5.0. It is thought that a surfactant with an HLB value of greater than 5.0 can insufficiently reduce surface activity of the filling liquid. As a result, the filling liquids of the ink sets (IS-6) and (IS-7) had insufficient runniness.

<Study B: Alcohol Compound in Filling Liquid>

Next, the alcohol compound used in the filling liquid was studied. [Preparation of Filling Liquids (F-8) to (F-15)]

Filling liquids (F-8) to (F-15) were prepared according to the same method as that for preparing the filling liquids (F-1) in all aspects other than that the amounts of the components added were changed to those as shown in Tables 5 and 6 below.

[Preparation of Ink Sets (IS-8) to (IS-15)]

The ink (I-1) was combined with any one of the filling liquids (F-8) to (F-15) as shown below in Tables 5 to 6. Through the above, ink sets (IS-8) to (IS-15) were prepared.

[Evaluation]

With respect to each of the ink sets (IS-8) to (IS-15), agglomeration inhibition of the ink and runniness of the filling liquid were evaluated according to the same methods as those for evaluating the ink sets (IS-1) to (IS-7). The evaluation results are shown below in Tables 5 to 6.

Terms in Tables 5 and 6 are explained below.

PEG-200: polyethylene glycol ("PEG-200", product of Sanyo Chemical Industries, Ltd.), mass average molecular weight 200

Nonyl Alc: nonyl alcohol, carbon number 9
Decyl Alc: n-decyl alcohol, carbon number 10
Dodecyl Alc: n-dodecyl alcohol, carbon number 12
Myristyl Alc: myristyl alcohol, carbon number 14

TABLE 5

|  |  |  | Ink set | | | |
|---|---|---|---|---|---|---|
|  |  |  | IS-8 | IS-9 | IS-10 | IS-11 |
| Ink | Type |  | I-1 | I-1 | I-1 | I-1 |
| Filling liquid | Type |  | F-8 | F-9 | F-10 | F-11 |
|  | PEG-200 [% by mass] |  | 20.0 | 20.0 | 20.0 | 20.0 |
|  | Surfactant | Type | S-2 | S-2 | S-2 | S-2 |
|  |  | % by mass | 0.10 | 0.10 | 0.10 | 0.10 |
|  | Glycerin [% by mass] |  | 20.0 | 20.0 | 20.0 | 20.0 |
|  | Sodium hydroxide |  | Used to adjust pH to 8.0 to 9.0 (trace amount) | | | |
|  | Alcohol compound | Type | Nonyl Alc | Decyl Alc | Dodecyl Alc | Myristyl Alc |
|  |  | Carbon number | C9 | C10 | C12 | C14 |
|  |  | ppm | 0.5 | 0.5 | 0.5 | 0.5 |
|  | Water |  | Rest | Rest | Rest | Rest |
|  | Total [% by mass] |  | 100.0 | 100.0 | 100.0 | 100.0 |
| Evaluation | Agglomeration inhibition |  | B | A | A | B |
|  | Runniness |  | A | A | A | A |

TABLE 6

|  |  |  | Ink set | | | |
|---|---|---|---|---|---|---|
|  |  |  | IS-12 | IS-13 | IS-14 | IS-15 |
| Ink | Type |  | I-1 | I-1 | I-1 | I-1 |
| Filling liquid | Type |  | F-12 | F-13 | F-14 | F-15 |
|  | PEG-200 [% by mass] |  | 20.0 | 20.0 | 20.0 | 20.0 |
|  | Surfactant | Type | S-2 | S-2 | S-2 | S-2 |
|  |  | % by mass | 0.10 | 0.10 | 0.10 | 0.10 |

TABLE 6-continued

|  |  |  | Ink set | | | |
|---|---|---|---|---|---|---|
|  |  |  | IS-12 | IS-13 | IS-14 | IS-15 |
|  | Glycerin [% by mass] |  | 20.0 | 20.0 | 20.0 | 20.0 |
|  | Sodium hydroxide |  | Used to adjust pH to 8.0 to 9.0 (trace amount) | | | |
|  | Alcohol compound | Type | Decyl Alc | Decyl Alc | Decyl Alc | Decyl Alc |
|  |  | Carbon number | C10 | C10 | C10 | C10 |
|  |  | ppm | 0.07 | 0.1 | 1.0 | 1.3 |
|  | Water |  | Rest | Rest | Rest | Rest |
|  | Total [% by mass] |  | 100.0 | 100.0 | 100.0 | 100.0 |
| Evaluation | Agglomeration inhibition |  | B | A | A | B |
|  | Runniness |  | A | A | A | A |

As shown in Tables 5 and 6, each of the filling liquids (F-9), (F-10), (F-13), and (F-14) respectively included in the ink set (IS-9), (IS-10), (IS-13), and (IS-14) contained a specific alcohol compound with a carbon number of at least 10 and no greater than 12. The amount of content of the specific alcohol compound in each of the filling liquids (F-9), (F-10), (F-13), and (F-14) was at least 0.1 ppm and no greater than 1.0 ppm. In each of the ink sets (IS-9), (IS-10), (IS-13), and (IS-14), the filling liquid easily run into the ink flow channel of the recording head and agglomeration of the pigment components of the ink in the recording head was effectively inhibited.

By contrast, each of the filling liquids (F-8) and (F-11) respectively included in the ink sets (IS-8) and (IS-11) contained an alcohol compound with a carbon number of less than 10 or an alcohol compound with a carbon number of greater than 12. The alcohol compound with a carbon number of less than 10 has relatively high hydrophilicity, and accordingly is thought to insufficiently promote micellization of the specific surfactant. The alcohol compound with a carbon number of greater than 12 has relatively high hydrophobic and forms micelles of itself. Accordingly, the alcohol compound with a carbon number of greater than 12 is thought to insufficiently promote micellization of the specific surfactant. As a result, the ink sets (IS-8) and (IS-11) insufficiently inhibited agglomeration of the pigment components of the ink in the recording head.

The filling liquid (F-12) included in the ink set (IS-12) had an amount of content of the specific alcohol compound of less than 0.1 ppm. The filling liquid (F-12) is thought to have insufficiently promoted micellization of the specific surfactant due to shortage of the specific alcohol compound. As a result, the ink set (IS-12) insufficiently inhibited agglomeration of the pigment components of the ink in the recording head.

The filling liquid (F-15) included in the ink set (IS-15) had an amount of content of the specific alcohol compound of greater than 1.0 ppm. Due to the amount thereof being excessive, the specific alcohol compound in the filling liquid (F-15) has inhibited dispersion of the pigment particles. As a result, the ink set (IS-15) insufficiently inhibited agglomeration of the pigment components of the ink in the recording head.

<Study C: Alkanediol>
Study of 1,2-alkanediol in the ink was performed next.
[Preparation of Inks (I-2) to (I-9)]
Inks (I-2) to (I-9) were prepared according to the same method as that for preparing the ink (I-1) in all aspects other than that the amounts of the components added were changed to those shown below in Tables 7 to 9.
[Preparation of Ink Sets (IS-16) to (IS-23)]
Any one of the inks (I-2) to (I-9) was combined with the filling liquid (F-2) as shown below in Tables 8 and 9. Through the above, ink sets (IS-16) to (IS-23) were prepared.
[Evaluation]
With respect to each of the ink sets (IS-16) to (IS-23), agglomeration inhibition of the ink and runniness of the filling liquid were evaluated according to the same methods as those for evaluating the ink sets (IS-1) to (IS-7). The evaluation results are shown below in Tables 8 and 9.

Terms in Tables 8 and 9 are explained below.
1,2-Hex: 1,2-hexanediol, carbon number 6
1,2-Hep: 1,2-heptanediol, carbon number 7
1,2-Oct: 1,2-octanediol, carbon number 8
1,2-Non: 1,2-nonanediol, carbon number 9

TABLE 7

| Ink | Amount charged [% by mass] |
|---|---|
| Pigment dispersion (D) | 40.0 |
| SURFYNOL (R) 420 | 0.3 |
| Triethylene glycol monobutyl ether | 4.0 |
| 2-Pyrrolidone | 5.0 |
| Glycerin | 20.0 |
| Alkanediol of type and in amount indicated in Tables 8 and 9 | |
| Ion exchange water | Rest |
| Total | 100.0 |

TABLE 8

|  |  |  | Ink set | | | |
|---|---|---|---|---|---|---|
|  |  |  | IS-16 | IS-17 | IS-18 | IS-19 |
| Ink | Type |  | I-2 | I-3 | I-4 | I-5 |
|  | Alkanediol | Type | 1,2-Hex | 1,2-Hep | 1,2-Oct | 1,2-Non |
|  |  | Carbon number | C6 | C7 | C8 | C9 |
|  |  | % by mass | 0.5 | 0.5 | 0.5 | 0.5 |

TABLE 8-continued

|  |  | Ink set | | | |
| --- | --- | --- | --- | --- | --- |
|  |  | IS-16 | IS-17 | IS-18 | IS-19 |
| Filling liquid | Type | F-2 | F-2 | F-2 | F-2 |
| Evaluation | Agglomeration inhibition | B | A | A | B |
|  | Runniness | A | A | A | A |

TABLE 9

|  |  |  | Ink set | | | |
| --- | --- | --- | --- | --- | --- | --- |
|  |  |  | IS-20 | IS-21 | IS-22 | IS-23 |
| Ink | Type |  | I-6 | I-7 | I-8 | I-9 |
|  | Alkanediol | Type | 1,2-Oct | 1,2-Oct | 1,2-Pen | — |
|  |  | Carbon number | C8 | C8 | C5 | — |
|  |  | % by mass | 0.3 | 1.5 | 0.5 | — |
| Filling liquid | Type |  | F-2 | F-2 | F-2 | F-2 |
| Evaluation | Agglomeration inhibition |  | A | A | B | B |
|  | Runniness |  | A | A | A | A |

As shown in Table 8, each of the inks (I-3), (I-4), (I-6), and (I-7) respectively included in the ink sets (IS-17), (IS-18), (IS-20), and (IS-21) contained 1,2-alkanediol with a carbon number of 7 or 8. In each of the ink sets (IS-17), (IS-18), (IS-20), and (IS-21), the filling liquid easily run into the ink flow channel of the recording head and agglomeration of the pigment components of the ink in the recording head was effectively inhibited.

By contrast, each of the inks (I-2), (I-8), and (I-9) respectively included in the ink sets (IS-16), (IS-22), and (IS-23) did not contain 1,2-alkanediol with a carbon number of 7 or 8. It is thought that the inks (I-2), (I-8), and (I-9) were insufficiently mixed with the filling liquid due to non-containment of 1,2-alkanediol with a carbon number of 7 or 8. As a result, the ink sets (IS-16), (IS-22), and (IS-23) insufficiently inhibited agglomeration of the pigment components of the ink in the recording head.

The ink (I-5) included in the ink set (IS-19) contained 1,2-alkanediol with a carbon number of 9. It is thought that the 1,2-alkanediol with a carbon number of 9 has high hydrophobicity and reduces dispersibility of the pigment. As a result, the ink set (IS-19) insufficiently inhibited agglomeration of the pigment components of the ink in the recording head.

What is claimed is:

1. An ink set comprising:
   an inkjet ink; and
   a recording head filling liquid, wherein
   the inkjet ink contains a pigment, water, and 1,2-alkanediol with a carbon number of 7 or 8,
   the recording head filling liquid contains a specific surfactant, water, and a specific alcohol compound with a carbon number of at least 10 and no greater than 12,
   the specific surfactant has an HLB value of no greater than 5.0, and
   a content of the specific alcohol compound in the recording head filling liquid is at least 0.1 ppm and no greater than 1.0 ppm.

2. The ink set according to claim 1, wherein
   the specific surfactant includes an acetylene glycol-based surfactant or a sorbitan fatty acid ester.

3. The ink set according to claim 1, wherein
   a percentage content of the specific surfactant in the recording head filling liquid is at least 0.03% by mass and no greater than 0.30% by mass.

4. The ink set according to claim 1, wherein
   the specific alcohol compound includes n-decyl alcohol or n-dodecyl alcohol.

5. The ink set according to claim 1, wherein
   a percentage content of the 1,2-alkanediol in the inkjet ink is at least 0.2% by mass and no greater than 2.0% by mass.

6. The ink set according to claim 1, wherein
   the recording head filling liquid is used in a manner to be filled in a recording head in which the inkjet ink remains.

7. A recording head inspection method that uses the ink set according to claim 1, the method comprising:
   performing inspection to inspect ejection performance of a recording head; and
   filling the recording head filling liquid into the recording head after the performing inspection, wherein
   in the performing inspection, the ejection performance of the recording head is inspected by ejecting the inkjet ink from the recording head.

* * * * *